United States Patent
Gillay et al.

(10) Patent No.: US 9,844,900 B2
(45) Date of Patent: Dec. 19, 2017

(54) TWO PIECE HOUSING ASSEMBLY WITH ELONGATED ATTACHMENT AND METHOD FOR MAKING THE SAME

(71) Applicant: Toyota Motor Engineering & Manufacturing North America, Inc., Erlanger, KY (US)

(72) Inventors: Daniel F. Gillay, Plymouth, MI (US); Que-Whang Rhee, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 672 days.

(21) Appl. No.: 14/249,848

(22) Filed: Apr. 10, 2014

(65) Prior Publication Data
US 2015/0291012 A1   Oct. 15, 2015

(51) Int. Cl.
| | |
|---|---|
| *B29C 45/14* | (2006.01) |
| *E05B 85/02* | (2014.01) |
| *B60R 13/02* | (2006.01) |
| *B29C 45/26* | (2006.01) |
| *B29L 31/30* | (2006.01) |
| *B29C 45/00* | (2006.01) |

(52) U.S. Cl.
CPC .... *B29C 45/14008* (2013.01); *B29C 45/2673* (2013.01); *B60R 13/0243* (2013.01); *E05B 85/02* (2013.01); *B29C 2045/0093* (2013.01); *B29L 2031/3005* (2013.01); *Y10T 292/57* (2015.04)

(58) Field of Classification Search
CPC .... B60R 13/0243; B60J 5/0416; E05B 85/02; E05B 85/12; F16B 5/0664; Y10T 292/57; Y10T 16/458
USPC ................. 296/146.7, 1.08; 292/336.3, 347, 292/DIG. 31, DIG. 38, DIG. 53, DIG. 11
See application file for complete search history.

(56) References Cited

U.S. PATENT DOCUMENTS

| | | | | |
|---|---|---|---|---|
| 4,038,718 | A | * 8/1977 | Reilhac | .................. E05B 85/12 292/336.3 |
| 4,497,514 | A | * 2/1985 | Moriya | .................. E05B 85/12 16/412 |
| 5,183,302 | A | * 2/1993 | Pelachyk | ................ E05B 85/12 292/336.3 |
| 5,291,641 | A | 3/1994 | Morino | |
| 5,577,779 | A | 11/1996 | Dangel | |

(Continued)

FOREIGN PATENT DOCUMENTS

WO      2005115732 A1     12/2005

*Primary Examiner* — Joshua J Michener
*Assistant Examiner* — Matthew J Gitlin
(74) *Attorney, Agent, or Firm* — Dinsmore & Shohl LLP

(57) ABSTRACT

A first part having an attachment having an elongated body configured to release from a second attachment of a second part under a desired force, and a method of manufacturing the same is provided. The first attachment includes a generally elongated body extending outwardly from the first wall with respect to the first support surface, the first wall further including at least one indent, the at least one indent formed on the first wall and open to a peripheral side edge of the elongated body, the indent extending into the wall a predetermined depth so as to provide the elongated body with a predetermined resiliency.

15 Claims, 9 Drawing Sheets

(56) References Cited

U.S. PATENT DOCUMENTS

| | | | |
|---|---|---|---|
| 5,628,533 A * | 5/1997 | Hill | B65D 50/046 |
| | | | 292/80 |
| 6,305,725 B1 | 10/2001 | Antonucci et al. | |
| 6,478,346 B1 | 11/2002 | Veser et al. | |
| 7,104,575 B2 * | 9/2006 | Kakita | E05B 85/12 |
| | | | 292/348 |
| 7,681,755 B2 | 3/2010 | Roesler | |
| 8,038,433 B2 | 10/2011 | Cullison et al. | |
| 8,220,848 B2 * | 7/2012 | Minemura | B29C 45/2708 |
| | | | 292/336.3 |
| 8,408,611 B2 * | 4/2013 | Takagai | E05B 77/04 |
| | | | 292/336.3 |
| 8,511,707 B2 * | 8/2013 | Amamori | B60R 21/2035 |
| | | | 280/728.2 |
| 8,616,611 B2 * | 12/2013 | Schidan | B60J 5/0416 |
| | | | 292/336.3 |
| 2004/0212215 A1 * | 10/2004 | Minemura | B29C 45/2708 |
| | | | 296/146.7 |
| 2008/0022602 A1 * | 1/2008 | Senoo | B60N 2/466 |
| | | | 49/502 |
| 2010/0146862 A1 * | 6/2010 | Lin | B60J 5/0416 |
| | | | 49/502 |
| 2011/0175377 A1 * | 7/2011 | Tanaka | E05B 85/12 |
| | | | 292/336.3 |
| 2013/0168980 A1 * | 7/2013 | Minemura | E05B 79/06 |
| | | | 292/336.3 |

* cited by examiner

US 9,844,900 B2

TWO PIECE HOUSING ASSEMBLY WITH ELONGATED ATTACHMENT AND METHOD FOR MAKING THE SAME

BACKGROUND OF THE INVENTION

A housing assembly configured to hold a device may be coupled together using attachments. The housing assembly includes a first part and a second part each having an attachment. The attachments interact with each other so as to release one part of the housing assembly from the other part under a predetermined pressure. In some instances an attachment includes an elongated body. The length of the elongated body may be designed so as to release the elongated body from the attachment of other part under a predetermined pressure.

Due to packaging constraints it may not be feasible to physically lengthen the length of the elongated body. Accordingly, it is known to form a slot along the sides of the elongated body and adjust a slot length along the side edges of the elongated body so as to add more or less resiliency. It should be appreciated that the resiliency of the elongated body correlates to the amount of force needed to release the elongated body from the attachment of other part.

However, in instances where the part is injection molded, the creation of a slot adjacent an elongated body and the adjustment thereof requires a more sophisticated mold relative to molds configured to create a part without such a slot. One reason for the added sophistication is that the mold designer must take into account material flow through the mold. Further, as such slots are formed by the core mold touching the cavity mold along the slot and thus part flare may occur along the formed slots. Accordingly, it remains desirable to have a housing assembly wherein the first part includes an elongated body having a resiliency which is tuned without the use of slots.

SUMMARY OF THE INVENTION

A two part assembly is provided. The two part assembly includes a first part configured to attach to a second part. The first part includes a first support surface, a first wall and a first attachment. The first wall defines a portion of a peripheral edge of the first part. The first support surface is generally planar. The first wall projects upwardly from the first support surface so as to bound the peripheral edge of the first support surface. The first attachment extends upwardly from the wall.

The second part includes a second wall and a second attachment. The second wall generally defines the periphery of the second part. The second attachment may be mounted to an outer surface of the second wall. The second attachment is configured to engage the first attachment so as to attach the first part to the second part.

The first attachment has a generally elongated body. The elongated body extends outwardly and upwardly with respect to the first support surface. The elongated body is generally coaxial to the first wall.

The first wall includes at least one indent. The indent is formed on the first wall and is open to a peripheral side edge of the first attachment so as to be formed at the base of the first attachment. The indent extends into the first wall so as to form a thinned out section of the first wall. The indent has a predetermined depth so as to provide the elongated body with a predetermined resiliency allowing the first attachment to be disengaged from the second attachment at a predetermined force.

With reference now to the figures, the two part assembly may be a housing assembly configured to house a door handle wherein the second part is a. The trim piece has the second attachment. The trim piece includes the second wall bounding a space configured to hold a door handle. The second attachment is formed on an outer surface of the second wall.

The first part is a base. The base may be mounted to vehicle structure, such as the door frame of the vehicle. The base includes the first support surface, the first wall, and the first attachment. The first wall defines a portion of the periphery of the base. The support surface is generally planar and the first wall projects outwardly from the first support surface. The first wall has a generally uniform thickness. The first attachment is configured to engage the second attachment so as to attach the trim piece to the base.

The first attachment has a generally elongated body extending outwardly wherein an inner surface of the elongated body is configured to abut against an outer surface of the second wall of the trim piece. An indent is formed on the first wall and is open to a peripheral side edge of the first attachment so as to form a thinned out section adjacent the base of the elongated body. The indent extends into the first wall a predetermined depth so as to provide the elongated body with a predetermined resiliency.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE PREFERRED EMBODIMENTS

Figure 1:
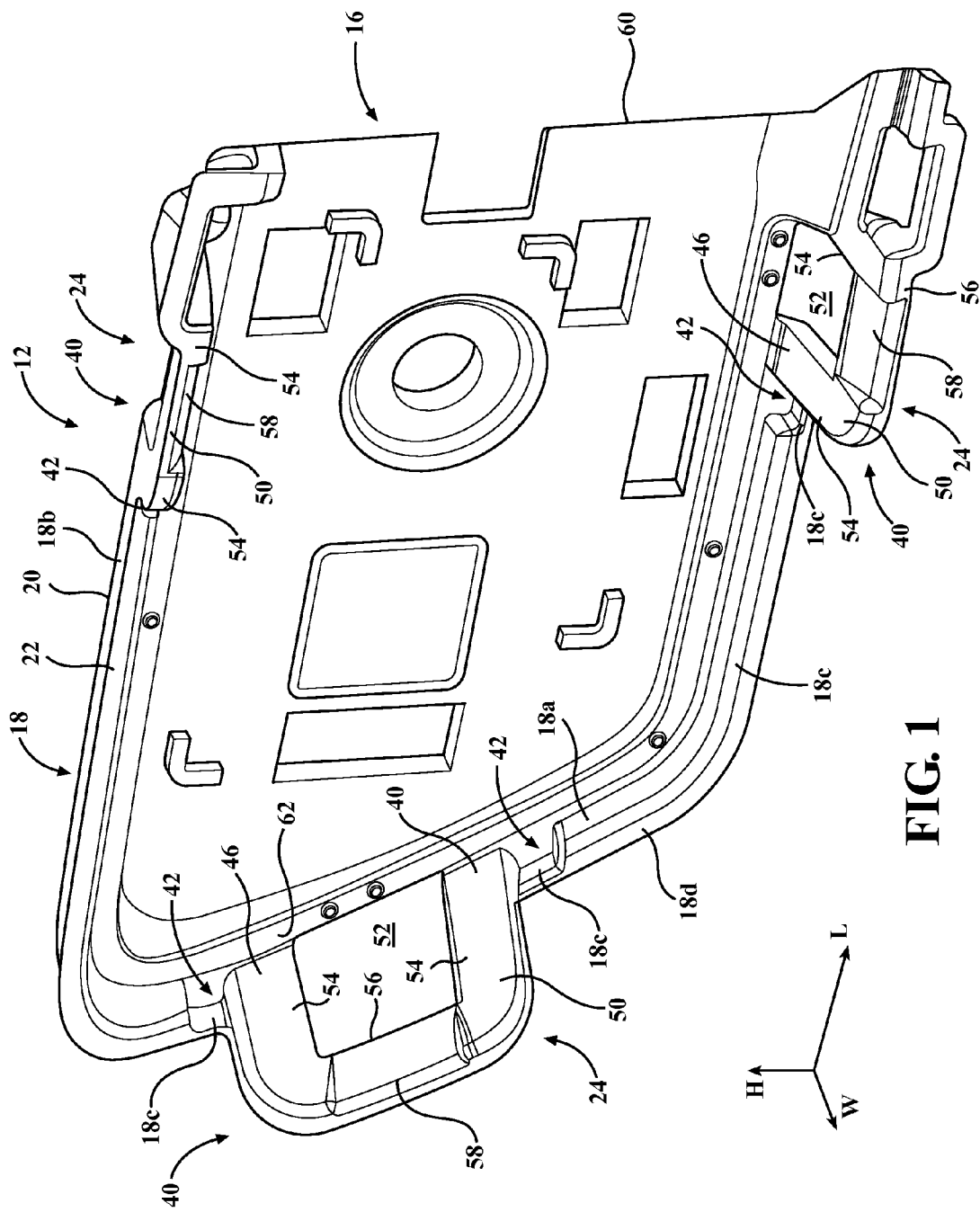
FIG. 1 is a perspective view of a first part having slots adjacent the peripheral side edges of the elongated body.
Figure 6:
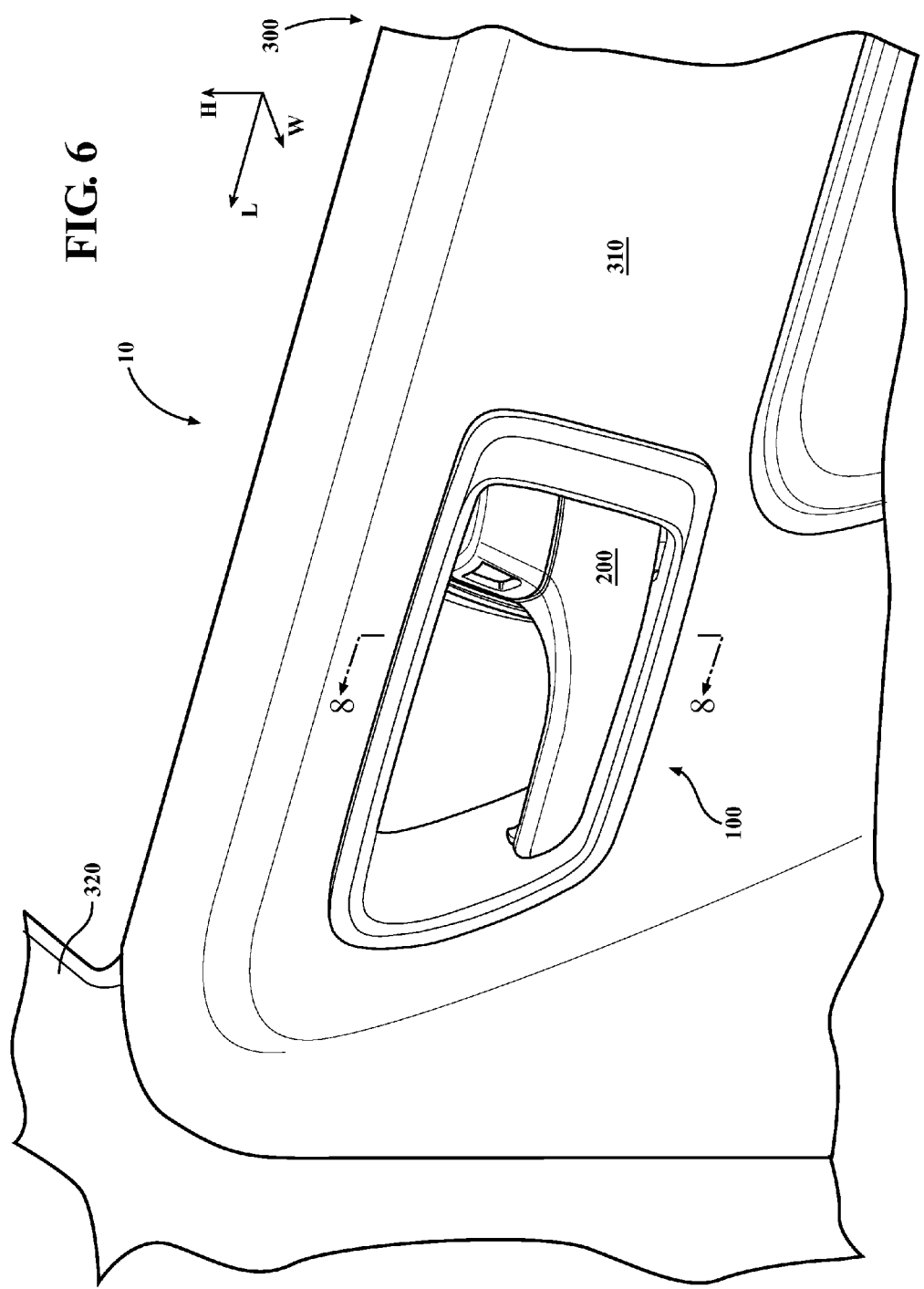
FIG. 6 is an illustrative example of a door handle housing assembly mounted to the interior trim of an automotive vehicle.
Figure 7:
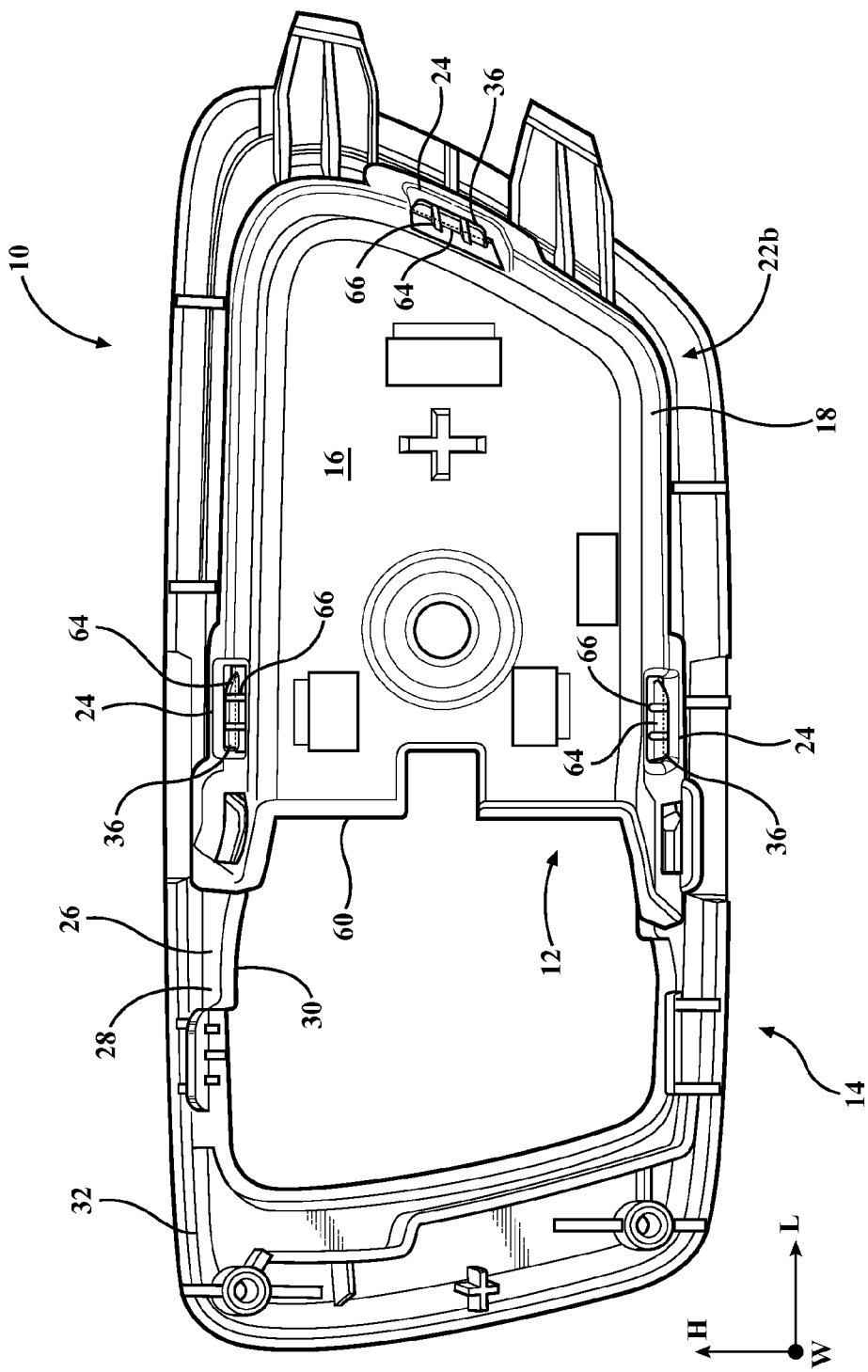
FIG. 7 is a cross-sectional view of FIG. 6 taken along line 7-7.
Figure 8:
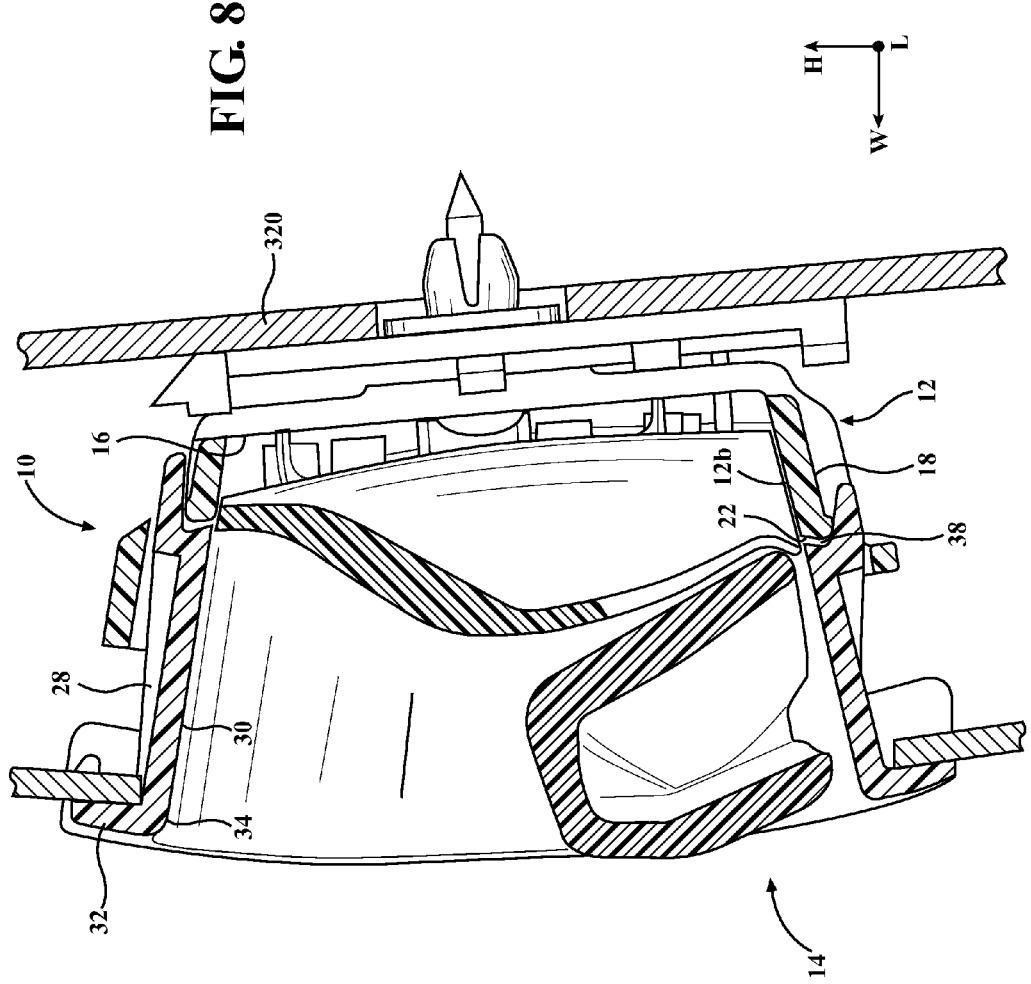
FIG. 8 is a top down view showing the first part mounted to the second part.

With reference now to FIGS. 6, 7 and 8, an illustrative embodiment of a two part assembly 10 is provided. The two part assembly 10 includes a first part 12 configured to attach to a second part 14. With reference now also to FIG. 1, an illustrative embodiment of a first part 12 is provided. The first part 12 includes a first support surface 16 and a first wall

18. The first support surface 16 is generally planar. The first wall 18 defines a portion of a first peripheral edge 20 of the first part 12. The first wall 18 includes a first distal edge 22 which is spaced apart from the first support surface 16 so as to define the length of the first wall 18 as measured along the W axis. The first wall 18 projects outwardly from the first support surface 16 along the W axis. The first support surface 16 is disposed along a plane defined by the L and H axes. The first wall 18 is generally uniform in thickness. The first part 12 further includes a first attachment 24.

With reference now also to FIGS. 7 and 8, an illustrative embodiment of a second part 14 is provided. The second part 14 includes a second wall 26 having a second outer surface 28 and a second inner surface 30. The second wall 26 generally defines the periphery of the second part 14. The second part 14 may be open in its center and may include a flange 32 disposed on a second peripheral edge 34 of the second wall 26. The flange 32 is disposed on a plane defined by the H and L axes. The second wall 26 includes a second attachment 36. The second attachment 36 may be mounted to the second outer surface 28 of the second wall 26.

Figure 2:
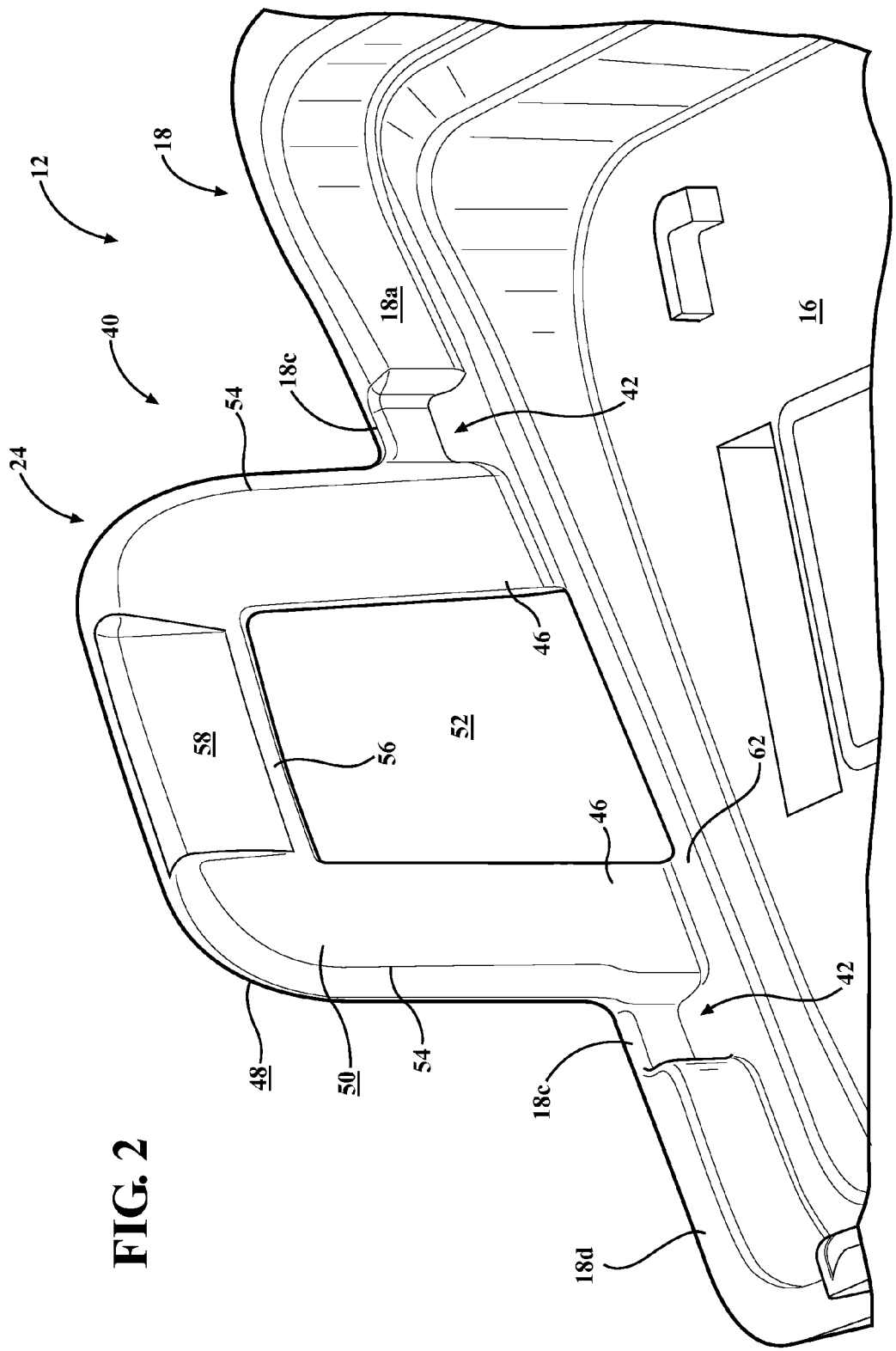
FIG. 2 is an isolated view of the first attachment.
Figure 3A:
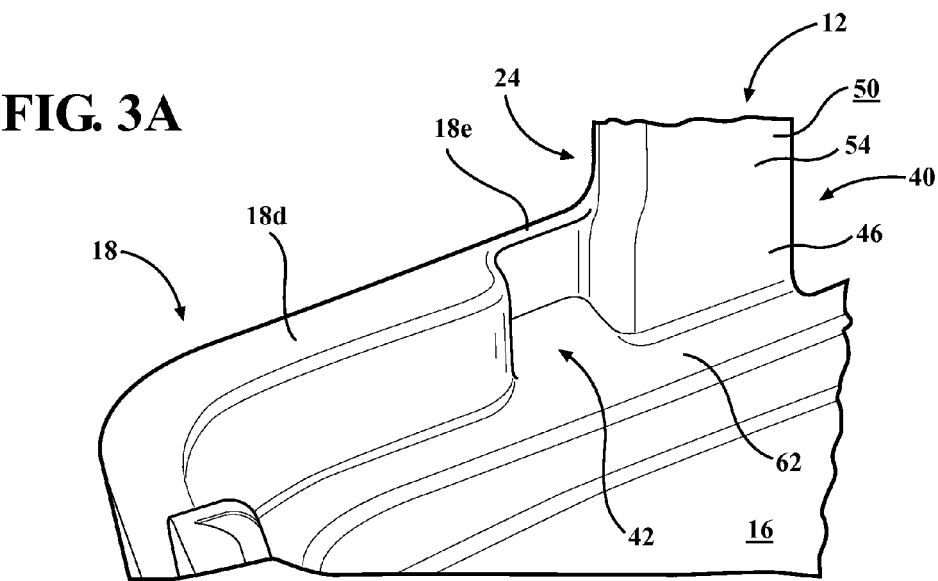
FIG. 3A is an illustrative view of an indent having a first predetermined thickness.
Figure 3B:
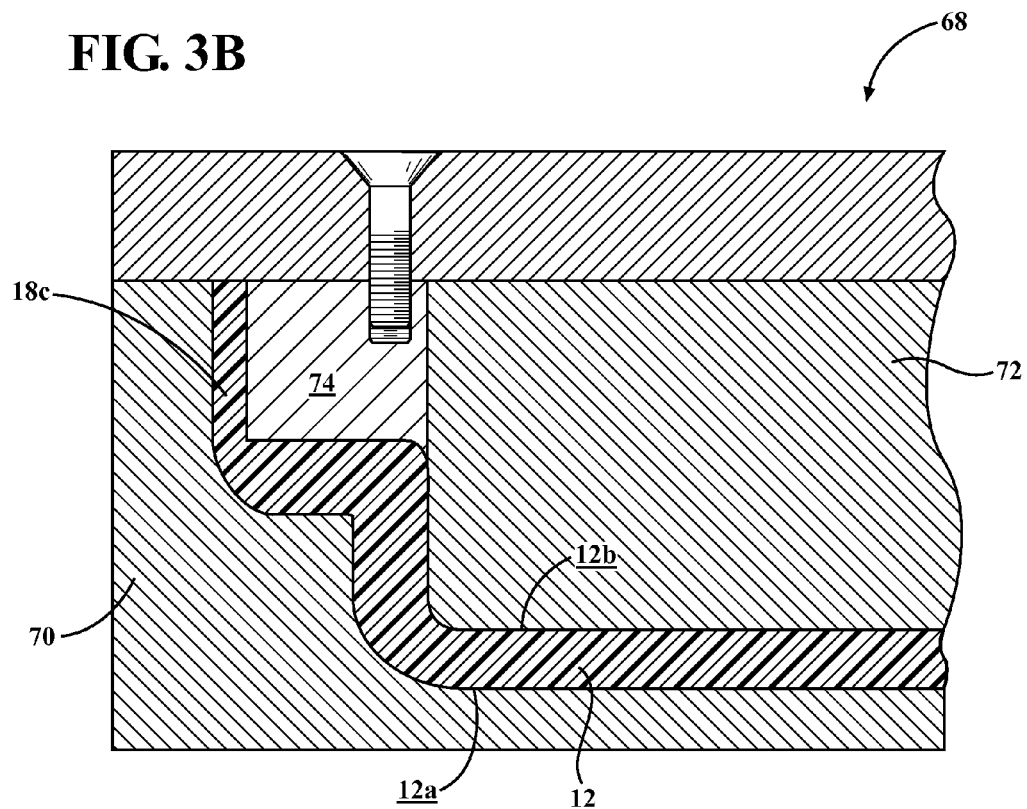
FIG. 3B is a cross section of a mold showing a blank forming the depth of the indent shown in FIG. 3A.

The first attachment 24 is configured to engage the second attachment 36 so as to attach the first part 12 to the second part 14, wherein the first distal edge 22 of the first part 12 and a second distal edge 38 of the second part 14 abut each other. The first attachment 24 includes a generally elongated body 40 extending outwardly along the W axis. As shown in FIGS. 1 and 2, the elongated body 40 is disposed along a plane common to the first wall 18.

The first part 12 includes at least one indent 42. The indent 42 is formed on the first wall 18 and is open to a peripheral side edge 44 of the first attachment 24. Preferably the indent 42 is formed at the base 46 of the elongated body 40 so as to define a thinned out section 18e of the first wall 18. The elongated body 40 includes an outer surface 48 and an inner surface 50. A portion of the inner surface 50 of the elongated body 40 may be generally coplanar with a first inner surface 18a of the first wall 18 such that the base 46 of the elongated body 40 has the same thickness as that of a substantial portion of the first wall 18.

With reference again to FIGS. 1 and 2, the first part 12 may include a pair of indents 42 each disposed on opposite peripheral side edges 44 of the base 46 of the elongated body 40. The elongated body 40 includes an opening 52. The opening 52 is disposed centrally within the elongated body 40 so as to define a pair of side legs 54 and a top edge 56.

The side legs 54 extend outwardly from the first wall 18 along the W axis. The top edge 50 extends between distal ends of the side legs 54 so as to close the opening 52. The bottom of the opening 52 is closed by the planar surface of the first support surface 16. The inner surface 50 may have a ramp shaped feature 58 disposed on the top edge 56. The ramp shaped feature 58 is configured to guide the first attachment 24 into engagement with the second attachment 36.

The indents 42 may be formed on the outer surface of each side leg 54, providing each of the side legs 54 with a corresponding resiliency. Thus it should be appreciated that though the indents 42 are shown as being generally uniform in dimension with each other, that the indents 42 may not be symmetrical so as to provide each side leg 54 with a desired resiliency. For instance, when manufacturing a two part assembly 10 wherein it is desirable to have a top edge 56 of the first attachment 24 release from the second attachment 36 before a bottom edge of the same first attachment 24, the indent 42 formed on the top side leg 54a may be larger than the indent 42 formed on the bottom side leg 54b.

The first wall 18 may partially bound the first peripheral edge 20 of the first support surface 16. As shown in FIG. 2, the first wall 18 may include a pair of spaced apart side walls 18b, 18c. The side walls 18b. 18c extend along the L axis. A third wall 18d encloses an end of the first support surface 16 and extends generally along the H axis between the side walls 18b, 18c.

An end of the first part 12 opposite the third wall 18d is open defining an end edge 60. The first wall 18 may include an inner wall ledge forming a step 62. The step 62 may run the entire length of the first wall 18, along the side walls 18b, 18c and the third wall 18d. However, it should be appreciated that the dimensions of the step 62 are provided herein for illustrative purposes and should not be limiting.

The second attachment 36 may include a lip 64 extending outwardly from an outer surface 28 of the second part 14. A top surface of the lip 64 is reinforced by a pair of ribs 66. The ribs 66 are aligned along the H axis so as to provide support for the lip 64 and keep the lip 64 in a predetermined position. The top edge 56 of the elongated body 40 is spatially dimensioned to fit over a top surface of the lip 64 when the second part 14 and the first part 12 are coupled together so as to provide a snap fit engagement securing the first and second parts together 12, 14. It should be appreciated that the exact dimensions of the first and second attachments 24, 36 are provided for illustrative purposes and are not limiting to the scope of the appended claims.

A single first attachment 24 may disposed on the third wall 18c. However, it should be appreciated that the first part 12 may include additional first attachments 24 configured to couple to a corresponding second attachment 36 of the second part 14. As illustratively shown, the first part 12 includes three first attachments 24, one on the third wall and a first attachment 24 on each of the side walls. The second part 14 includes three second attachments 36, each disposed on the second wall 26 of the second part 14 so as to receive the first attachments 24 of the first part 12.

With reference again to FIGS. 1, 6, 7 and 8, the two part assembly 10 may be a housing assembly 100 configured to house a door handle 200 mounted to a door assembly 300 of an automotive vehicle. The door assembly 300 includes an interior trim panel 310, a vehicle body 320, and an exterior side panel (not shown).

The second part 14 is a trim piece (also referenced as 14) and the first part 12 is a base (also referenced as 12). The trim piece 14 is mounted to the interior trim panel 310 and the base 12 is mounted to the vehicle body 320. It should be appreciated that though the vehicle body 320 is shown as the A pillar, the actual attachment of the base 12 to the vehicle body 320 is hidden by the trim panel 310. The trim piece 14 includes a first wall 18 bounding a space configured to hold the door handle 200. The trim piece 14 includes a flange 32 generally orthogonal to the second wall 26. The flange 32 is formed on the second peripheral edge 34 of the second wall 26. The second distal edge 38 of the second wall 26 is configured to abut against the first distal edge 22 of the base 12.

The base 12 has the first support surface 16. The first support surface 16 is generally planar and disposed along the plane defined by the H and L axes. The base 12 includes a first wall 18 and a first attachment 24. The first wall 18 defines a portion of the peripheral edge 20 of the base 12. The first support surface 16 may have a generally uniform thickness. The first wall 18 projects outwardly from the first support surface 16 along the plane generally defined by the W and H axes.

The first wall 18 has a generally uniform thickness. The first attachment 24 is formed along the first wall 18. The first attachment 24 includes a generally elongated body 40 extending outwardly along the W axis. The elongated body 40 includes a base 46 disposed on the first wall 18. The elongated body 40 includes an outer surface 48 and an inner surface 50. The inner surface 48 may have a ramp shaped feature 58 disposed on the top edge 56. The ramp shaped feature 58 is configured to guide the first attachment 24 into engagement with the second attachment 36. A portion of the inner surface 50 of the elongated body 40 may be generally coplanar with a first inner surface 18a of the first wall 18 such that the base 46 of the elongated body 40 has the same thickness as that of a substantial portion of the first wall 18. The elongated body 40 further includes an opening 52. The opening 52 is disposed centrally within the elongated body 40 so as to define a pair of side legs 54 and a top edge 56.

An indent 42 is formed on a peripheral side edge 44 of the first wall 18 adjacent the base 46. The indent 42 is open to the peripheral side edge 44 of the first attachment 24 so as to define a thinned section 18e of the first wall 18. The indent 42 extends into the first wall 18 a predetermined depth so as to provide the elongated body 40 with a desired resiliency. As shown in the figures, the housing assembly 100 may include a pair of indents 42. Each of the indents 42 are disposed on opposite peripheral side edges 44 of the elongated body 40.

Figure 9:
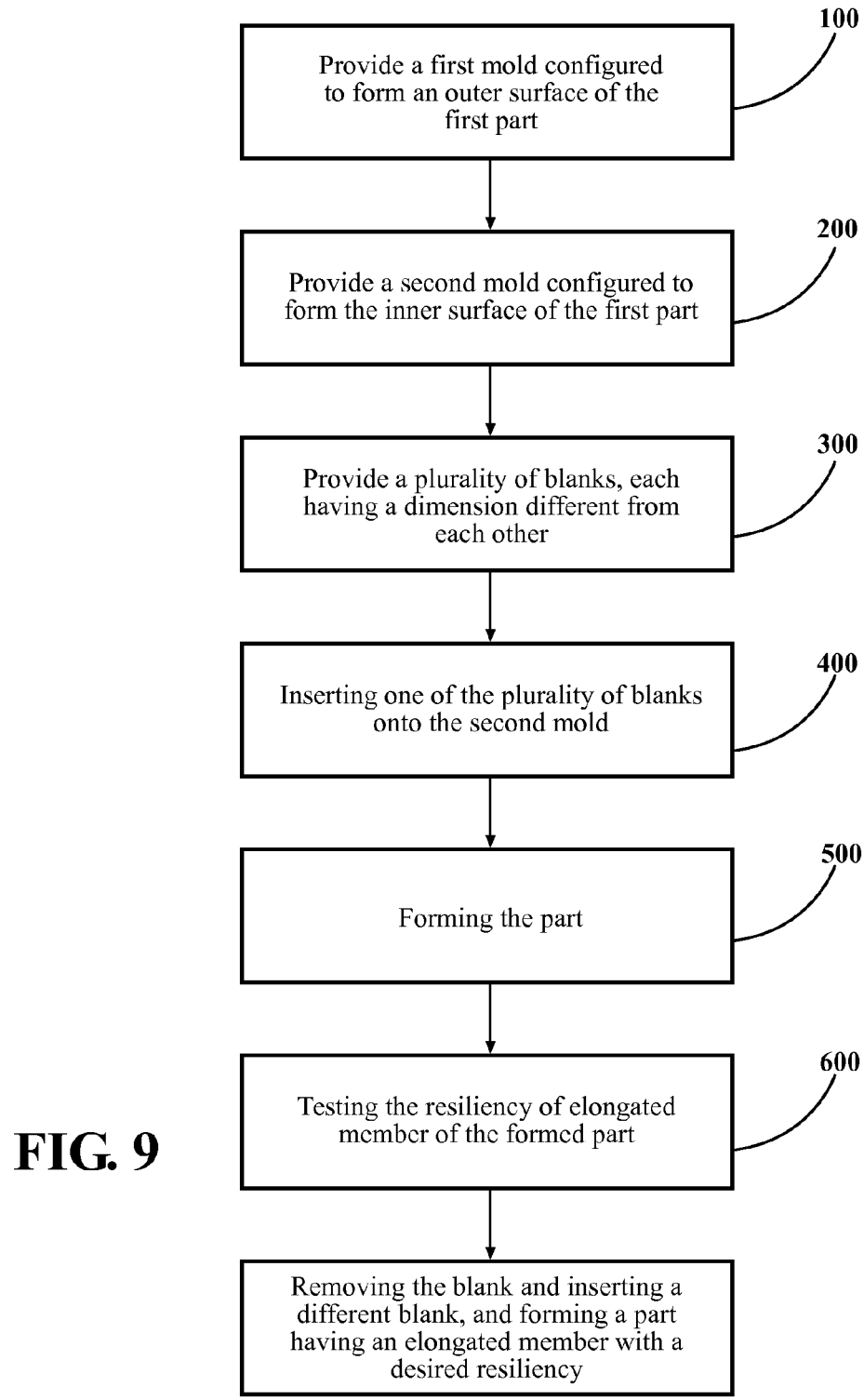
FIG. 9 is a diagram showing the method of making a part having an attachment feature with a desired resiliency.

The second attachment 36 includes a lip 64 extending outwardly from an outer surface 28 of the trim piece 14. A top surface of the lip 64 is reinforced by a pair of ribs 66. The ribs 66 are aligned along the H axis so as to provide support for the lip 64 and keep the lip 64 in a predetermined position. The top edge 56 of the elongated body 40 is spatially dimensioned to fit over a top surface of the lip 64 when the trim piece 14 and the base 46 are coupled together so as to provide a snap fit engagement securing the trim piece 14 to the base 12. As shown in FIG. 9, each elongated body 40 is coupled to a respective second attachment 36.

The base 46 of the elongated body 40 may be tuned so as to provide a desired resiliency wherein the release of the elongated body 40 from the second attachment 36 is achieved with a predetermined force. Accordingly, the door handle assembly may be tuned to facilitate the release of one of the first attachments 24 from a respective second attachment 36 before the release of another of the first attachments 24 with the second attachment 36 to which it is engaged.

As shown in FIGS. 4A-6B, the dimension of the indent 42 may be adjusted to achieve a desired resiliency. Though the dimension is shown being changed with respect to the thickness of the first wall 18, it should be appreciated that the dimension may be adjusted along the H axis as well. Thus not only the depth of the indent 42 with respect to the first wall 18 but also the length of the indent 42 may be tuned. It should be further appreciated that adjusting the dimensions of the indent 42 adjusts the flexibility and resiliency of a respective side leg 54, which in turn adjusts the amount of force required to disengage the trim piece 14 from the base 12.

With reference now to FIG. 9, a method for forming a two part assembly 10 utilizing a mold 68 for injection molding, wherein the mold 68 includes a first part 12 and a second part 14 is provided. The two part assembly 10 includes a first part 12 having a first support surface 16 which is generally planar and a first attachment 24 having an elongated body 40. The first part 12 is configured to attach to a second part 14.

Figure 4A:
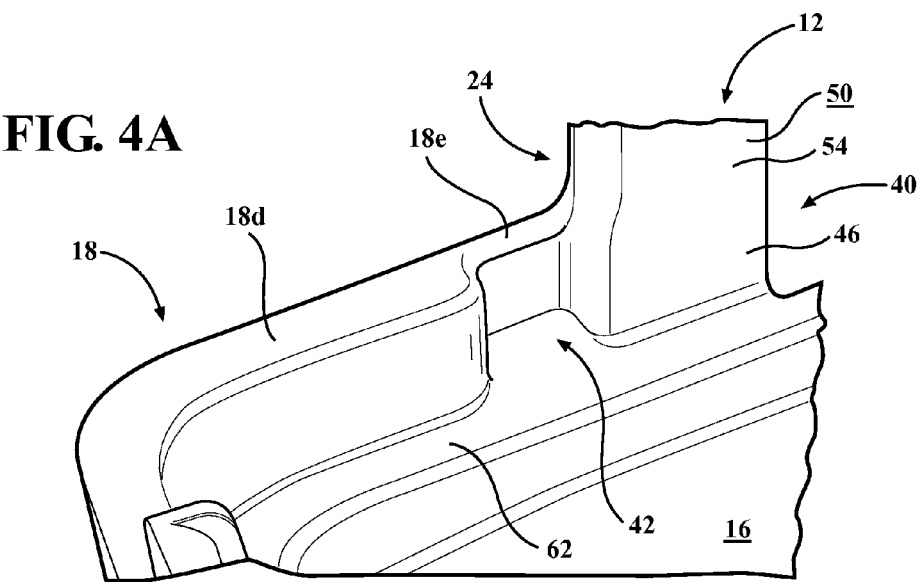
FIG. 4A is a perspective view of a first attachment having an indent of a second predetermined thickness.
Figure 4B:
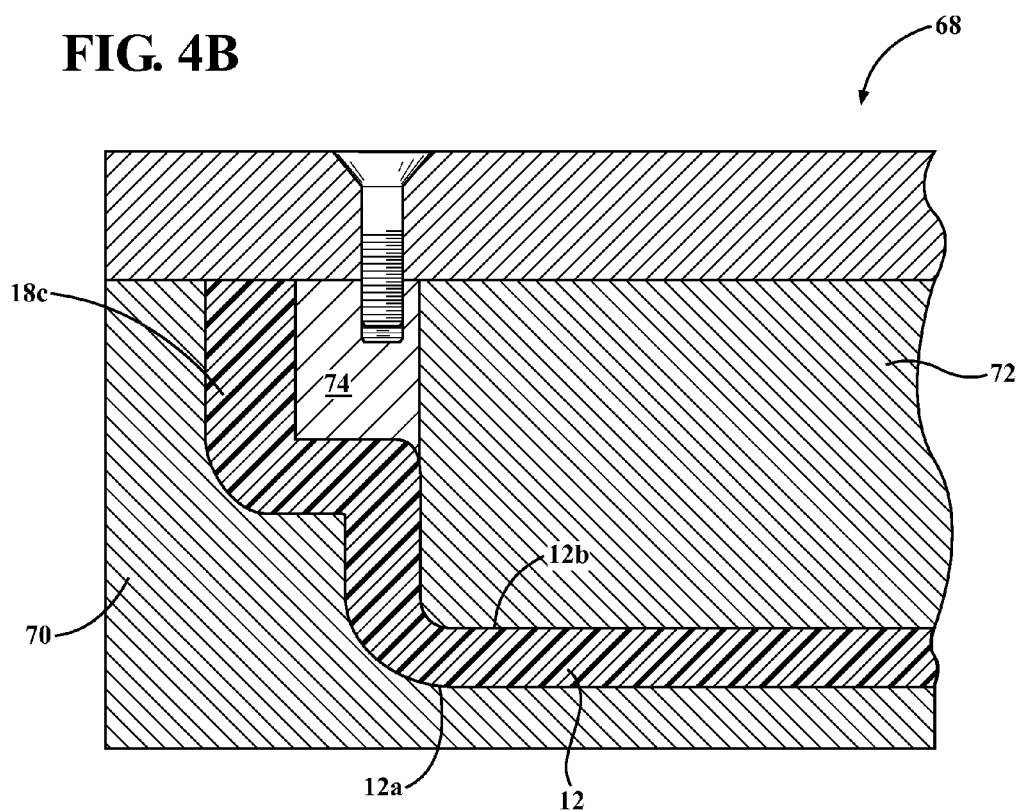
FIG. 4B is a cross section of a mold showing a blank forming the indent shown in FIG. 4A.
Figure 5A:
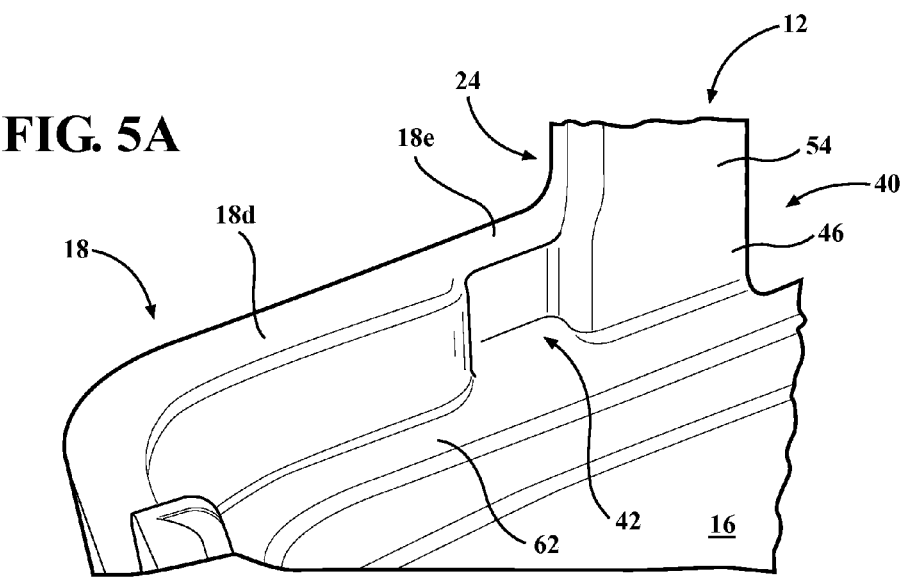
FIG. 5A is an attachment having an indent of a third predetermined thickness.
Figure 5B:
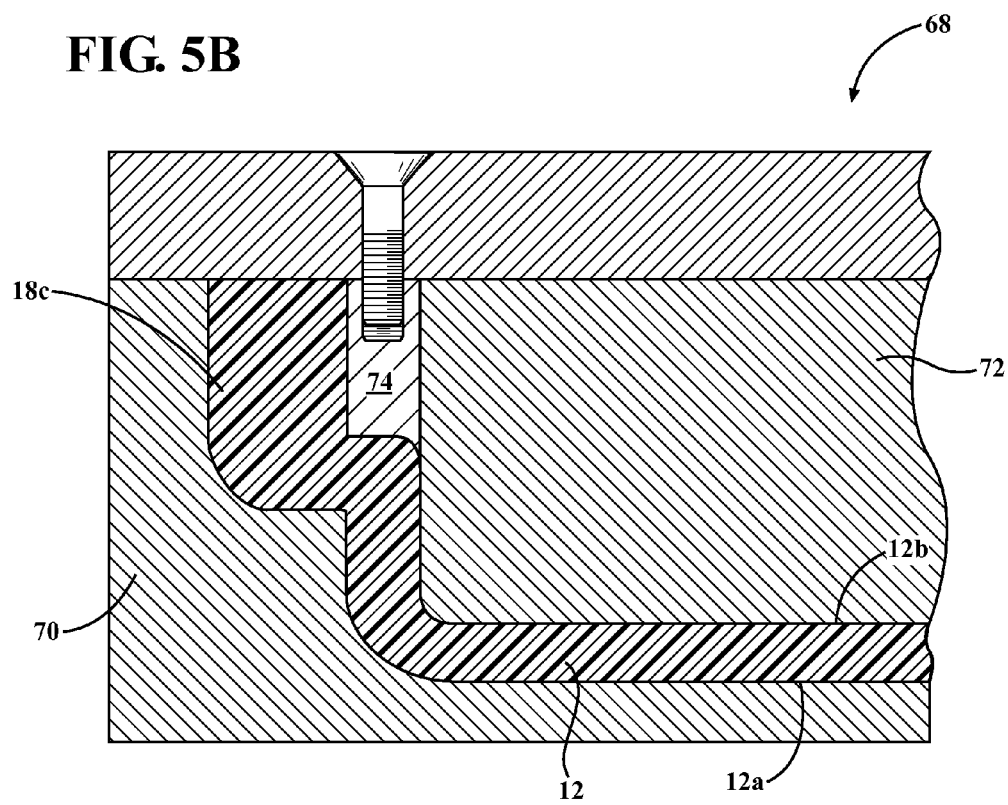
FIG. 5B is a cross section of a mold having a blank forming the indent shown in FIG. 5A.

The method begins with step 100 wherein a first mold 70 is provided. The first mold 70 is configured to form an outer surface 12a of the first part 12. In step 200 a second mold 72 is provided wherein the second mold 72 is configured to form the inner surface 12b of the first part 12. The first and second molds 70, 72 are pressed on top of each other as shown in FIGS. 4B, 5B, and 6B wherein the space between the first and second molds forms the shape of the first part 12.

The method proceeds to step 300 wherein a plurality of blanks 74 are provided. The blanks 74 have a predetermined dimension which are distinct from each other as shown in FIGS. 4B, 5B, and 6B. The blanks 74 are shown having different widths wherein the blank 74 in FIG. 4B produce a larger indent 42 relative to the blank 74 shown in FIG. 5B and the blank 74 shown in FIG. 5B produces a larger indent 42 than the blank 74 shown in FIG. 6B.

The method proceeds to step 400 wherein one of the plurality of blanks 74 is inserted in between the first and second molds 70, 72 adjacent the portion of the respective molds 70, 72 where the elongated body 40 is formed. For illustrative purposes, the blank 74 is attached onto the second mold 74. The blank 74 is inserted adjacent the elongated body 40 feature of the mold 68. As shown in FIGS. 5B, 4B, and 6B, the method proceeds to step 500 wherein the first part 12 is formed by injecting the mold 68 with a polymer which flows through the spaces between the first and second mold 70, 72 and as shown in FIGS. 4B, 5B, and 6B the respective blank 74.

The method proceeds to step 600 wherein the resiliency of the elongated body 40 is tested and wherein if the resiliency is not a desired resiliency the selected blank 74 is removed from the mold 68 and another one of the plurality of blanks 74 is inserted the mold 68 and a new first part 12 is formed and tested. The blanks 74 are selected and a first part 12 is molded until a first part 12 having an elongated body 40 with a desired resiliency is formed.

It should be appreciated that the blanks 74 may be welded onto the mold 68. The blanks 74 may be formed of a material substantially similar to that of the mold 68. Removal of the blank 74 may require the use of a grinder. A polisher may be used to smooth the surface of the mold and remove any remnants of the eliminated blank 72. It should also be appreciated and is illustratively shown in FIGS. 4A-6B that the blanks may have different widths. It should also be appreciated that the blanks may also differ in length such that the length of the thin walled section defining the indent 42 is varied from part to part so as to achieve a desired resiliency of the elongated body 40 to which the indent 42 is formed.

The invention has been described in an illustrative manner. It is therefore to be understood that the terminology used is intended to be in the nature of words of description rather than limitation. Many modifications and variations of the invention are possible in light of the above teachings without varying from the scope and spirit of the invention described herein.

The invention claimed is:

1. A housing assembly configured to house a door handle mounted to a vehicle, a portion of the housing assembly further configured to attach to an interior trim panel of a door assembly, the housing assembly comprising:

a base configured to attach to a trim piece, the trim piece having a second attachment, the base further configured to release from the trim piece under a predetermined force wherein, the base includes a first support surface and a first wall, the first wall defining a portion of a first peripheral edge of the base, the first support surface is generally planar, and the first wall projects outwardly from the first support surface, the first wall having a generally uniform thickness;
a first attachment configured to engage the second attachment so as to attach the base to the trim piece, the first attachment having a generally elongated body extending outwardly from the first wall with respect to the first support surface, a bottom portion of the elongated body being contiguous with the first wall; and
at least one indent, the at least one indent formed on the first wall, the at least one indent extending into the first wall a predetermined depth so as to define a peripheral side edge of the bottom portion of the elongated body, the peripheral side edge being open to the indent so as to provide the elongated body with a predetermined resiliency.

2. The housing assembly as set forth in claim 1, wherein the at least one indent is a pair of indents, each of the pair of indents disposed on an opposite peripheral side edge of the elongated body.

3. The housing assembly as set forth in claim 1, wherein the elongated body includes an opening, the opening disposed centrally within the elongated body so as to define a pair of side legs and a top edge, the side legs extending outwardly from the first wall, the top edge extending between distal ends of the side legs.

4. The housing assembly as set forth in claim 3, wherein the first wall includes a pair of spaced apart side walls and a third wall extending between proximal ends of the side walls and an open end opposite the third wall, wherein each of the respective side walls and the third wall have a first attachment.

5. The housing assembly as set forth in claim 1, wherein the first wall includes an inner wall ledge, forming a step.

6. The housing assembly as set forth in claim 1, wherein the trim piece includes a second wall bounding a space configured to hold the door handle.

7. A housing assembly configured to house a door handle mounted to a vehicle, a portion of the housing assembly further configured to attach to an interior trim panel of a door assembly, the housing assembly comprising:
a base having a first support surface, a first wall and a first attachment, the first wall defining a portion of a peripheral edge of the base, the first support surface is generally planar, and the first wall projects outwardly from the first support surface, the first wall having a generally uniform thickness, the first attachment having a generally elongated body extending outwardly from the first wall with respect to the first support surface, a bottom portion of the elongated body being contiguous with the first wall;
at least one indent, the at least one indent formed on the first wall, the at least one indent extending into the first wall a predetermined depth so as to define a thinned section of the first wall and a peripheral side edge of the bottom portion of the elongated body, the peripheral side edge being open to the indent and the thinned section of the first wall providing the elongated body with a predetermined resiliency; and
a trim piece having a second wall bounding a space configured to hold the door handle, the trim piece having a second attachment configured to engage the first attachment so as to secure the base to the trim piece.

8. The housing assembly as set forth in claim 7, wherein the at least one indent is a pair of indents, each of the pair of indents disposed on opposite peripheral side edges of the elongated body.

9. The housing assembly as set forth in claim 7, wherein the elongated body includes an opening, the opening disposed centrally within the elongated body so as to define a pair of side legs and a top edge, the side legs extending outwardly from the first wall, the top edge extending between distal ends of the side legs.

10. The housing assembly as set forth in claim 9, wherein the first wall includes a pair of spaced apart side walls and a third wall extending between proximal ends of the side walls, and an open end opposite the third wall, wherein each of the respective side walls and the third wall have a first attachment.

11. The housing assembly as set forth in claim 7, wherein the first wall includes an inner wall ledge, forming a step.

12. A housing assembly comprising:
a first part configured to attach to a second part, the second part including a second attachment, the first part further configured to release from the second part under a predetermined force wherein,
the first part includes a first support surface and a first wall, the first wall defining a portion of a first peripheral edge of the first part, the first support surface is generally planar, and the first wall projects outwardly from the first support surface, the first wall including a generally uniform thickness;
a first attachment configured to engage the second attachment so as to attach the first part to the second part, the first attachment includes a generally elongated body extending outwardly from the first wall with respect to the first support surface, a bottom portion of the elongated body being contiguous with the first wall, the elongated body includes an opening disposed centrally within the elongated body so as to define a pair of side legs and a top edge, the pair of side legs extend outwardly from the first wall, the top edge extends between distal ends of the pair of side legs; and
at least one indent, the at least one indent formed on the first wall, the at least one indent extending into the first wall a predetermined depth so as to define a peripheral side edge of the bottom portion of the elongated body, the peripheral side edge being open to the indent so as to provide the elongated body with a predetermined resiliency.

13. The housing assembly as set forth in claim 12, wherein the at least one indent is a pair of indents, each of the pair of indents disposed on an opposite peripheral side edge of the elongated body.

14. The housing assembly as set forth in claim 12, wherein the first wall includes a pair of spaced apart side walls and a third wall extending between proximal ends of the side walls and an open end opposite the third wall, wherein each of the respective side walls and the third wall have a first attachment.

15. The housing assembly as set forth in claim 12, wherein the first wall includes an inner wall ledge, forming a step.

* * * * *